(12) United States Patent
Noyau (10) Patent No.: US 9,727,212 B2
(45) Date of Patent: Aug. 8, 2017

(54) FULL SCREEN CONTENT VIEWING INTERFACE ENTRY

(71) Applicant: Google Inc., Mountain View, CA (US)

(72) Inventor: Eric Noyau, Samois sur Seine (FR)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 14/367,213

(22) PCT Filed: Jul. 9, 2013

(86) PCT No.: PCT/IB2013/001802
§ 371 (c)(1),
(2) Date: Jun. 19, 2014

(87) PCT Pub. No.: WO2015/004496
PCT Pub. Date: Jan. 15, 2015

(65) Prior Publication Data
US 2015/0185984 A1 Jul. 2, 2015

(51) Int. Cl.
*G06F 3/048* (2013.01)
*G06F 3/041* (2006.01)
(Continued)

(52) U.S. Cl.
CPC .......... *G06F 3/0483* (2013.01); *G06F 3/0482* (2013.01); *G06F 3/0485* (2013.01); *G06F 3/0488* (2013.01); *G06F 3/04842* (2013.01); *G06F 3/04886* (2013.01); *G06F 17/3089* (2013.01)

(58) Field of Classification Search
CPC . G06F 3/048; G06F 3/041; G06F 3/00; G06F 17/00; G06F 17/30
See application file for complete search history.

(56) References Cited

U.S. PATENT DOCUMENTS 5,910,802 A 6/1999 Shields et al.
6,025,841 A * 2/2000 Finkelstein ........... G06F 3/0481
715/803
(Continued)

OTHER PUBLICATIONS

Enable Full Screen Browsing & Hidden Features in Google Chrome Beta Android App, Jan. 27, 2013, https://www.youtube.com/watch?v=BSg6_JejGRY, pp. 1-2.*
(Continued)

*Primary Examiner* — Jennifer To
*Assistant Examiner* — Hugo Molina
(74) *Attorney, Agent, or Firm* — McDermott Will & Emery LLP (57) ABSTRACT

Methods for entering a full screen content viewing interface of an application are provided. In one aspect, a method includes receiving a request to provide content for display within a viewing region of an application and receiving a single touch input within the viewing region. The method also includes determining whether at least a portion of the content within the viewing region is obscured by a user interface element. When at least a portion of the content within the viewing region is obscured by the user interface element, the method includes removing the user interface element from the application. Systems and machine-readable media are also provided.

20 Claims, 7 Drawing Sheets

(51) Int. Cl.
*G06F 3/00* (2006.01)
*G06F 17/30* (2006.01)
*G06F 3/0483* (2013.01)
*G06F 3/0488* (2013.01)
*G06F 3/0485* (2013.01)
*G06F 3/0482* (2013.01)
*G06F 3/0484* (2013.01)

(56) References Cited

U.S. PATENT DOCUMENTS

| | | | | |
|---|---|---|---|---|
| 8,775,965 | B1* | 7/2014 | Kuscher | G06F 3/0481 707/E17.107 |
| 8,959,453 | B1* | 2/2015 | Harnish | H04N 7/0122 715/719 |
| 2008/0094368 | A1* | 4/2008 | Ording | G06F 3/0488 345/173 |
| 2009/0235193 | A1* | 9/2009 | Bhatt | G06F 3/04847 715/765 |
| 2010/0070915 | A1* | 3/2010 | Tsutsui | G06F 3/0488 715/800 |
| 2010/0088632 | A1 | 4/2010 | Knowles et al. | |
| 2010/0088654 | A1* | 4/2010 | Henhoeffer | G06F 3/04883 715/863 |
| 2011/0115711 | A1* | 5/2011 | Gunawan | G06F 1/1626 345/169 |
| 2011/0242002 | A1* | 10/2011 | Kaplan | G06F 3/04883 345/173 |
| 2011/0273388 | A1 | 11/2011 | Joo et al. | |
| 2012/0072867 | A1* | 3/2012 | Schlegel | G06F 3/0481 715/808 |
| 2012/0084630 | A1* | 4/2012 | Meiskey | G06F 17/30867 715/205 |
| 2012/0159318 | A1* | 6/2012 | Shaw | G06F 3/0481 715/273 |
| 2012/0194503 | A1* | 8/2012 | Chauvin | G06F 3/04815 345/419 |
| 2012/0304111 | A1 | 11/2012 | Queru | |
| 2012/0306749 | A1* | 12/2012 | Liu | G06F 3/0488 345/163 |
| 2013/0080937 | A1* | 3/2013 | Sirpal | G06F 3/1438 715/761 |
| 2013/0135221 | A1* | 5/2013 | Ainslie | G06F 3/038 345/173 |
| 2013/0227468 | A1* | 8/2013 | Wu | G06F 3/0488 715/786 |
| 2014/0002383 | A1* | 1/2014 | Hsieh | G06F 3/017 345/173 |

OTHER PUBLICATIONS

"Atomic Web Browser," http://atomicwebbrowser.com/v5/start/guide.php?device=ipad%23share, visited Jun. 6, 2014.
Stack Overflow, "Double Tap to Full Screen," http://stackoverflow.com/questions/10986429/double-tap-to-fullscreen, Jun. 11, 2012.
Atomic Web Browser, "Version 6 is out," http://atomicwebbrowser.com/?p=277, Dec. 5, 2012.
Google Chrome Blog, "More Immersive Mobile Web," http://chrome.blogspot.com/2013/04/more-immersive-mobile-web.html, Apr. 10, 2013.

* cited by examiner

FULL SCREEN CONTENT VIEWING INTERFACE ENTRY

BACKGROUND

Field

The present disclosure generally relates to the transmission of data over a network, and more particularly to the use of a computing device to display data communicated over a network.

Description of the Related Art

Software applications, particularly mobile device software applications like web browsers, have limited screen space with which to display content such as a web page. Many such applications include a toolbar or other graphical user interface with which a user may interact with the content or application. In such instances, the toolbar or other graphical user interface element occupies a portion of the limited screen space and often obscures content or reduces the amount of screen space in which the content can be displayed. Certain applications include options to "hide" the toolbar or other graphical user interface, but activation of such options is usually cumbersome. For example, activation of the option may require several interactions by the user (e.g., the use of multiple fingers or multiple touch interactions), thereby introducing additional latency before hiding the toolbar. As another example, activation of the option may still use a portion of the limited screen space (e.g., to display a full screen button on screen to exit the full screen content viewing interface) even when the toolbar is hidden.

SUMMARY

According to certain embodiments of the present disclosure, a method for entering a full screen content viewing interface of an application is provided. The method includes receiving a request to provide content for display within a viewing region of an application and receiving a single touch input within the viewing region. The method also includes determining whether at least a portion of the content within the viewing region is obscured by a user interface element. When at least a portion of the content within the viewing region is obscured by the user interface element, the method includes removing the user interface element from the application.

According to certain embodiments of the present disclosure, a system for entering a full screen content viewing interface of an application is provided. The system includes a memory that includes instructions, and a processor. The processor is configured to execute the instructions to receive a request to provide content for display within a viewing region of an application, and receive a single touch input within the viewing region. The processor is also configured to execute the instructions to determine whether at least a portion of the content within the viewing region is obscured by a user interface element. When at least a portion of the content within the viewing region is obscured by the user interface element, the processor is configured to execute the instructions to remove the user interface element from the application and entering a full screen content viewing mode.

According to certain embodiments of the present disclosure, a machine-readable storage medium that includes machine-readable instructions for causing a processor to execute a method for entering a full screen content viewing interface of an application is provided. The method includes receiving a request to provide content for display within a viewing region of a web browser, and receiving a single touch input within the viewing region. The method also includes determining whether at least a portion of the content within the viewing region is obscured by a user interface element includes at least one of a toolbar or a button. When at least a portion of the content within the viewing region is obscured by the user interface element, the method further includes removing the user interface element from the web browser and entering a full screen content viewing mode.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides for an expedited and automatic entry into a full screen content viewing interface (or "full screen mode") in an application in response to a single tap gesture by a user when viewing content. Entry into the full screen content viewing interface in the application in response to the single tap gesture may be configured to occur where a user has interacted with the content and at least a portion of the content is currently obscured by a graphical user interface such as a toolbar. For instance, if a user is viewing a topmost portion of a web page in a mobile web browser and a toolbar for the mobile web browser is displayed at the top of the application, then the toolbar is not obscuring any web page content and the toolbar will remain displayed even in response to a single tap gesture by the user. If, however, the user has interacted with the web page such that at least a portion of the web page is obscured by the toolbar, such as where the user has scrolled down from the topmost portion of the web page to view content in the web page, then in response to a single tap gesture anywhere within the web page the toolbar will automatically hide and the application will enter a full screen content viewing interface.

Figure 1:
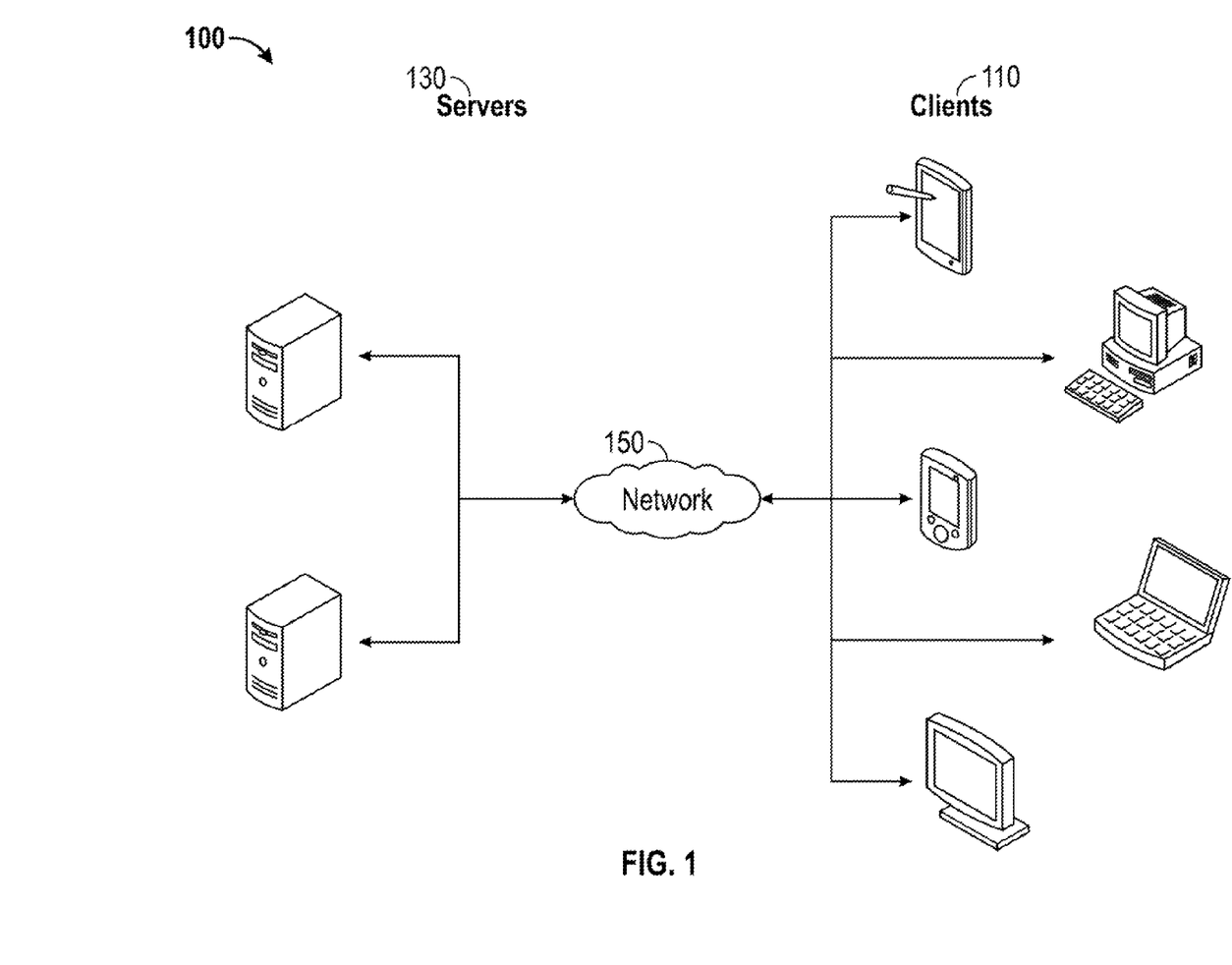
FIG. 1 illustrates an example architecture for entering a full screen content viewing interface of an application.

FIG. 1 illustrates an example architecture 100 for entering a full screen content viewing interface of an application. The architecture 100 includes servers 130 and clients 110 connected over a network 150.

Each of the clients 110 is configured to download, install, and run an application, such as a web browser, as disclosed herein. In certain aspects, the application is already available in the memory of the client 110 and does not need to be downloaded. The application is configured to run on clients 110 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. In certain aspects, certain advantages of the application, such as the ability to quickly respond to a touch input to enter full screen mode to maximize limited screen space for the display of content, may be more salient on clients 110 such as mobile devices that have limited screen space and touch interfaces.

If needed, the application can be downloaded over the network 150 from one of the many servers 130. For purposes of load balancing, multiple servers 130 can also host the data for downloading the application. In certain instances, different versions and/or configurations of the application that include the features disclosed herein are available for download from a server 130 and subsequent installation depending on whether the client 110 is a mobile device or non-mobile device. The application, once installed on a client 110, is configured to load content, such as web pages, from any one or multiple client servers 130 hosting the content. The servers 130 can be any device having an appropriate processor, memory, and communications capability for hosting the data for installing the application and/or for hosting the content. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed application, once downloaded from a server 130 and installed and executed on a client 110, is configured to display content. The content can be a downloaded web page, a locally generated web page, or other content, such as an image or text file. Although the examples discussed herein refer to a web page, any content that is viewable within the application is applicable to the disclosure. The disclosed application provides content for display within a viewing portion of the application. If a portion of the content provided for display within the viewing portion of the application is obscured by a user interface element of the application, such as a toolbar or button, then in response to a single touch input or "tap" by a user the application automatically "hides" or removes the user interface element from the display, thereby providing the content for display in a "full screen mode" (e.g., without any of the content being obscured by a user interface element of the application) in the viewing portion of the application. Due to the simple nature of the single touch input, the user is likely to activate this feature without any previous indication of its existence, thereby quickly and easily learning about this feature without reference to instructions.

Figure 2:
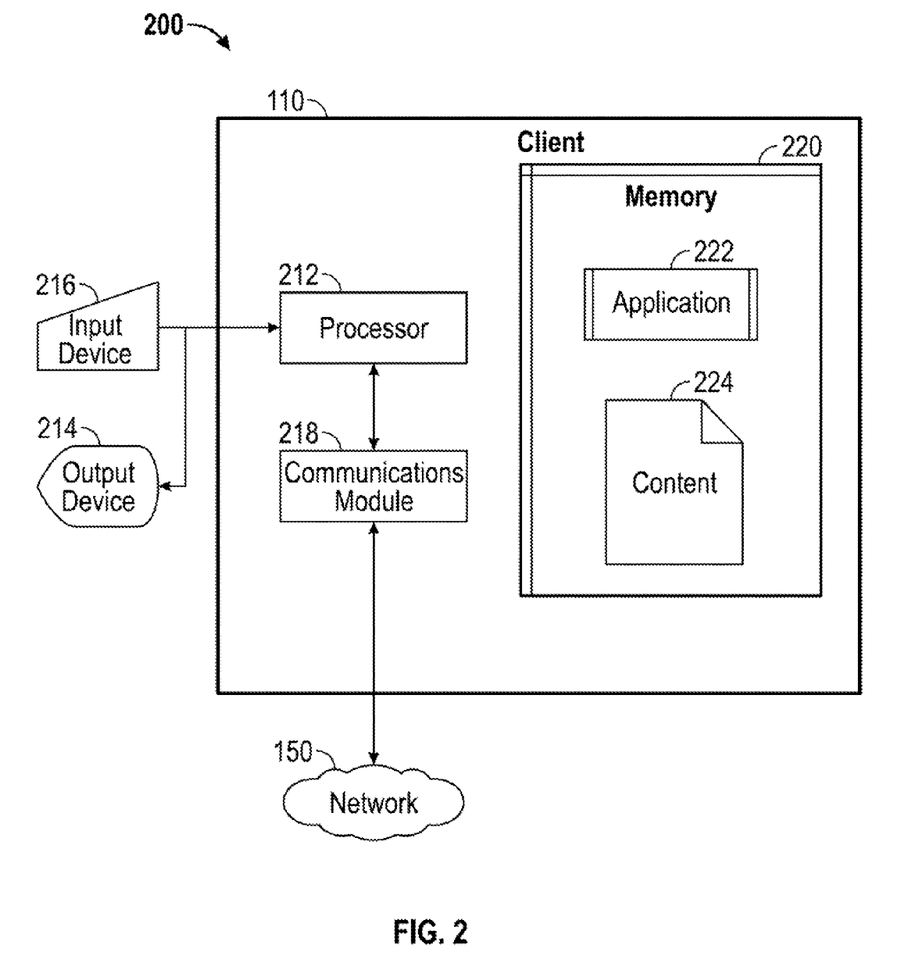
FIG. 2 is a block diagram illustrating the example client and server from the architecture of FIG. 1 according to certain aspects of the disclosure.

FIG. 2 is a block diagram 200 illustrating an example client 110 in the architecture 100 of FIG. 1 according to certain aspects of the disclosure. The client 110 is connected to the network 150 via a communications module 218. The communications module 218 us configured to interface with the network 150 to send and receive information, such as data, requests, responses, and commands to other devices on the network. The communications module 218 can be, for example, a modem or Ethernet card.

The client 110 includes a processor 212, the communications module 218, and memory 220 that includes an application 222 and content 224 to be viewed in the application 222. The application 222 can be, for example, a web browser. For instance, the web browser can be a mobile web browser configured for use with mobile devices, such as tablet computers and smartphones. The application 222 can also be, for example, a document editor or other content viewer, a mobile application, or any other application 222 configured to display content 224.

The content 224 can be obtained, for example, from a server 130 over the network 150. The content 224 can be, for example, a web page. The content 224 can also be a document, graphic, simple text, or any other data configured for display in the application 222 on the client 110. The client 110 also includes an input device 216, such as touch interface, and an output device 214, such as a display for displaying the application 222 and content 224. The processor 212 of the client 110 is configured to execute instructions, such as instructions physically coded into the processor 212, instructions received from software in memory 240, or a combination of both, to enter a full screen content viewing interface of the application 222.

For example, the processor 212 of the client 110 executes instructions to receive a request to provide content for display within a viewing region of the application 222, and receive a single touch input (e.g., by the input device 216) within the viewing region. The single touch input can be received, for example, upon a non-visible layer overlaid by the application 222 on the viewing region for the content 224. In certain embodiments, the single touch input is a single tap, such as a single tap is received within content 224 that is a web page. In certain aspects, the single tap can be received, for example, upon any content within the web page. For example, the single tap can be received on an image, hyperlink, text, white space, or any other content.

The processor 212 is further configured to determine whether at least a portion of the content 224 within the viewing region is obscured by a user interface element. The user interface element can be, for example, a toolbar or ribbon (e.g., a GUI widget on which on-screen buttons, icons, menus, or other input or output elements are placed). The user interface element can also be, for example, a button (e.g., a user interface element that provides the user a simple way to trigger an event, like searching for a query at a search engine, or to interact with dialog boxes, like confirming an action) or menu. When at least a portion of the content within the viewing region is obscured by the user interface element, the processor 212 is configured to remove the user interface element from the application 222.

In certain aspects, removing the user interface element from the application 222 includes the application 222 entering a full screen content viewing mode. For instance, in a full screen content viewing mode, the content 224 is capable of being displayed in any row, column or pixel location of the viewing region of the application 222.

In certain aspects, when at least a portion of the content 224 within the viewing region is obscured by the user interface element and the single tap is received upon a hyperlink in the content 224 (e.g., in a web page), the user interface element is not removed from the application 222. For example, if a portion of a web page in a web browser is obscured by a toolbar, and a user single taps a visible hyperlink on the web page, the web browser will not remove the toolbar from the display. Instead, the web browser may activate the hyperlink and load or otherwise display the content indicated by the hyperlink.

In certain aspects, when the single tap occurs within a preset time period of when the content within the viewing region is obscured by the graphical user interface element, the processor 212 is configured to remove the user interface element from the application 222. For example, if the single tap occurs within three seconds of when a user has scrolled down a web page in a web browser and a toolbar of the web browser obscures certain content in the web page, the toolbar is removed from display in the application 222. In certain aspects, when the single tap does not occur within the preset time period of when the content 224 within the viewing region (e.g., of the application 222) is obscured by the graphical user interface element, the user interface element is removed from the application. For example, if a single tap does not occur within three seconds of when the user has scrolled down the web page in the web browser and the toolbar of the web browser has obscured certain content in the web page, the toolbar is automatically removed from display in the application 222 after three seconds.

Figure 3:
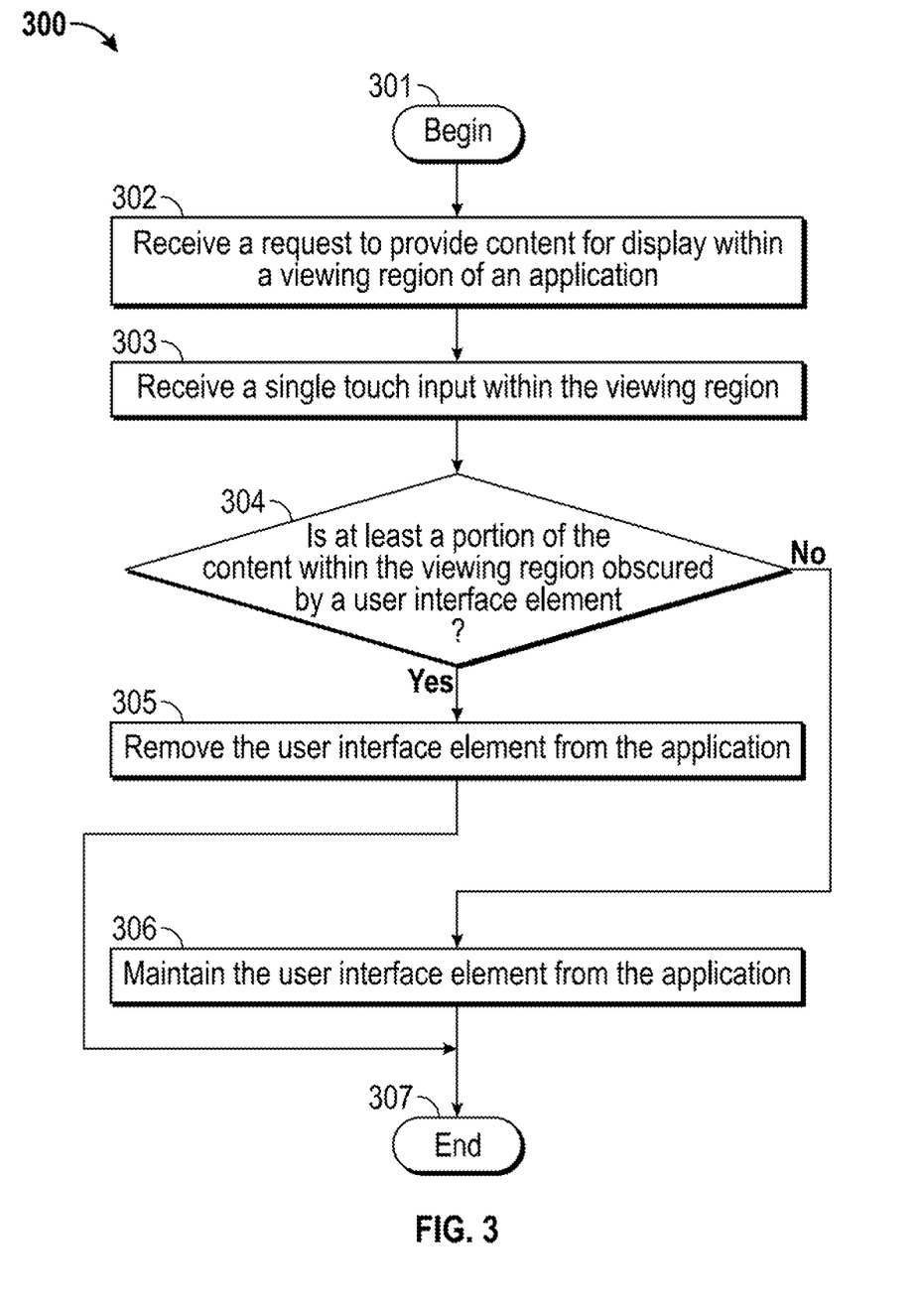
FIG. 3 illustrates an example process for entering a full screen content viewing interface of an application using an example client of FIG. 2.

FIG. 3 illustrates an example process 300 for entering a full screen content viewing interface of the application 222 using the example client 110 of FIG. 2. While FIG. 3 is described with reference to FIG. 2, it should be noted that the process steps of FIG. 3 may be performed by other systems. The process 300 begins by proceeding from beginning step 301 when an application 222 is opened on a client 110 to step 302 when a request is received (e.g., by the client 110) to provide content for display within a viewing region of the application 222. Next, in step 303, a single touch input is received within the viewing region of the application 222. Subsequently, in decision step 304, a determination is made whether at least a portion of the content 224 within the viewing region is obscured by a user interface element.

If the determination of decision step 304 indicates that at least a portion of the content within the viewing region is obscured by the user interface element, the process 300 proceeds to step 305 where the user interface element is removed from the application 222. If the determination of decision step 304 indicates that at least a portion of the content within the viewing region is not obscured by the user interface element, the process 300 proceeds to step 306 where the user interface element is maintained in the application 222. The process 300 then ends in step 307 after either step 305 or step 306.

FIG. 3 set forth an example process 300 for entering a full screen content viewing interface of an application 222 using the example client 110 of FIG. 2. An example will now be described using the example process 300 of FIG. 3, an application 222 that is a web browser, content 224 that is a web page, and a client 110 that is a mobile device.

Figure 4A:
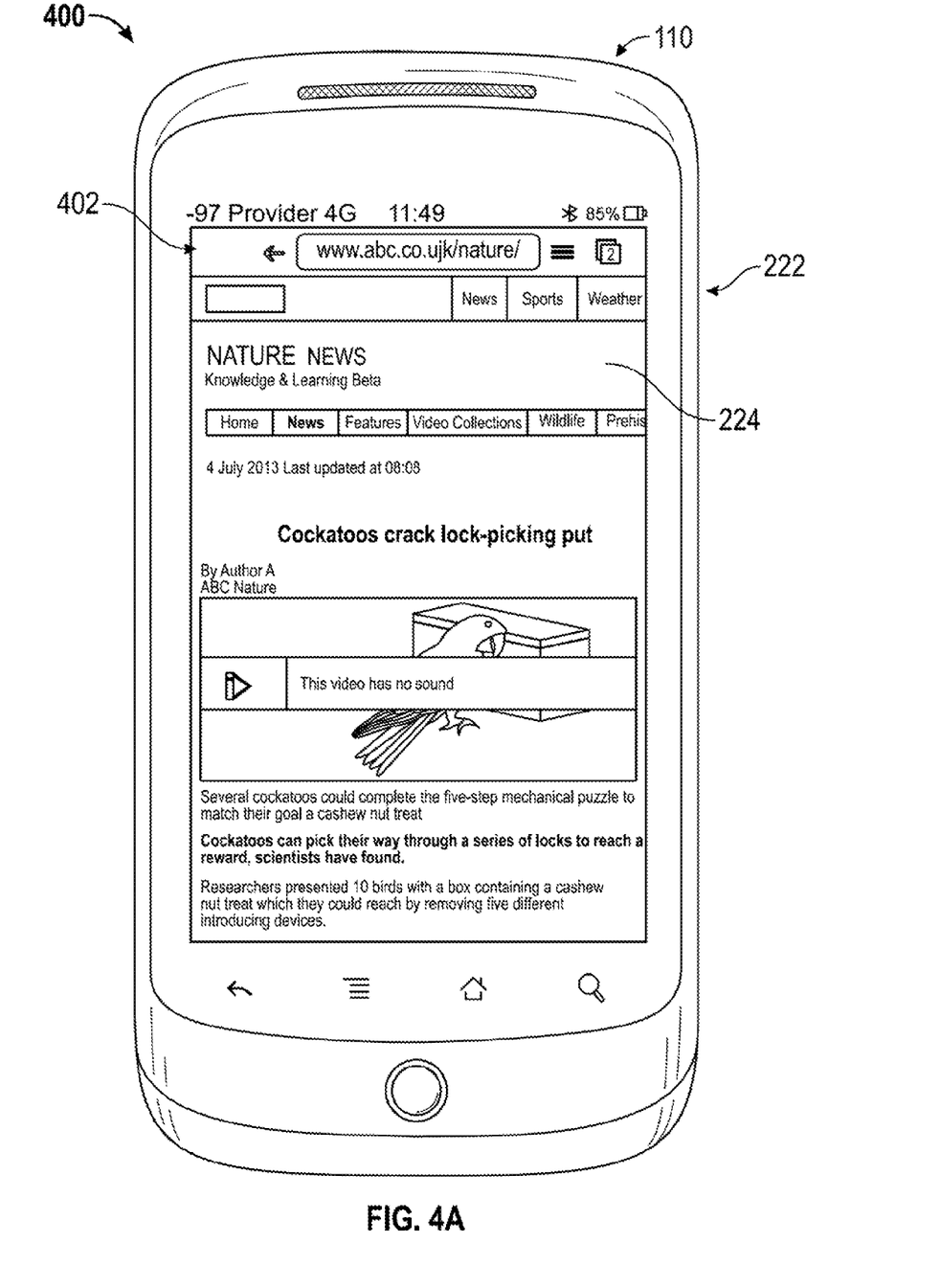
FIGS. 4A-4C are example illustrations associated with the example process of FIG. 3.

The process 300 begins by proceeding from beginning step 301 when the web browser 222 is opened on the mobile device 110. FIG. 4A provides an example illustration 400 of the web browser 222 as displayed on the mobile device. The web browser 222 includes a toolbar 402 and displays a web page 224. No portion of the web page 224 is obscured by the web browser 222 in example illustration 400 because the web browser 222 is displaying the topmost portion of the web page 224. In step 302, a request is received (e.g., by the mobile device 110) to scroll the web page 224 downward so that a lower portion of the web page 224 can be displayed within the viewing region of the web browser 222.

Figure 4B:
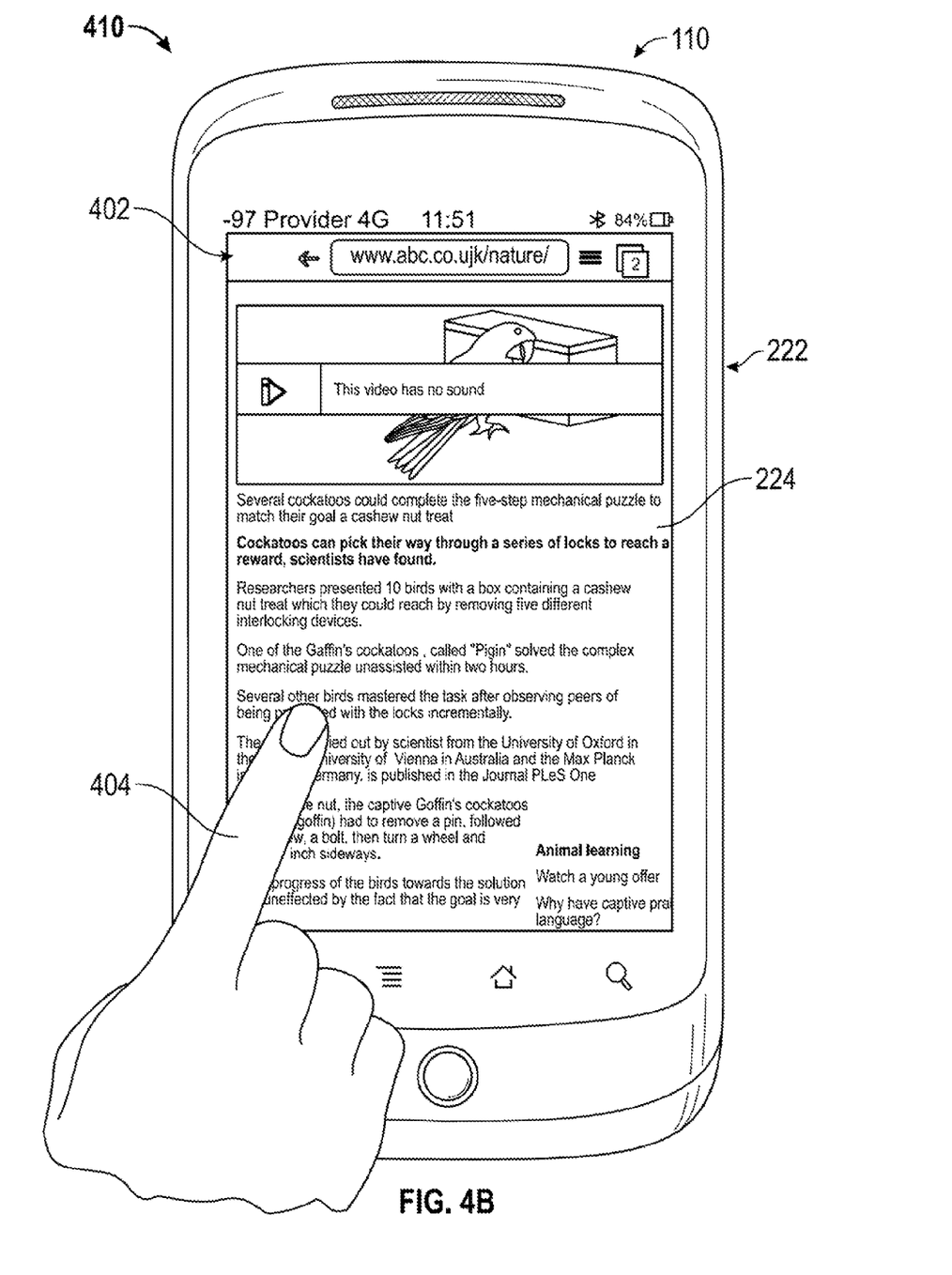
Figure 4C:
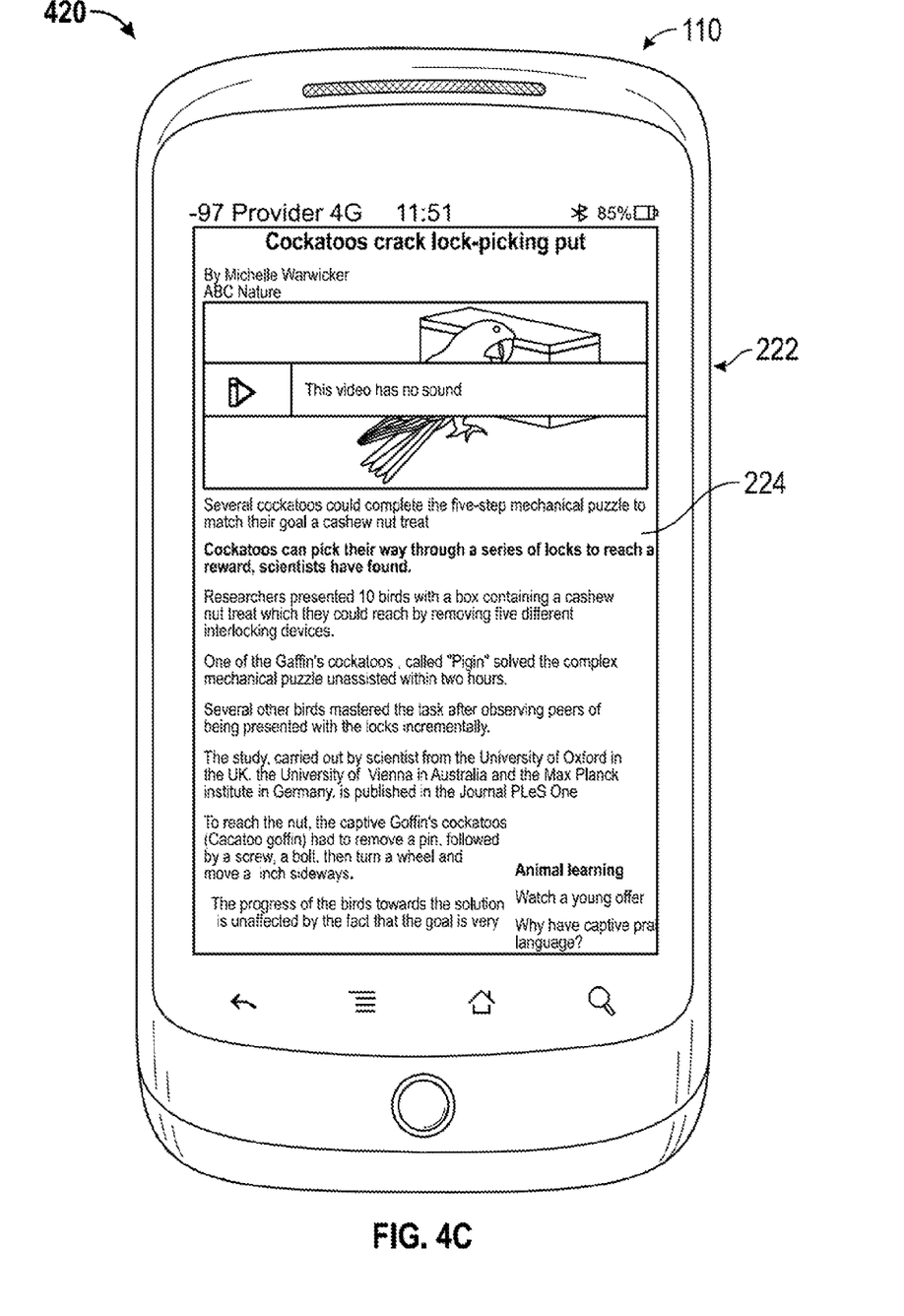

Next, in step 303, a single touch input 404 that is a single tap is received from a user within the displayed web page 224 within the viewing region of the application 222 as provided in the example illustration 410 of FIG. 4B. The web page 224 has been scrolled downward as compared to the example illustration of FIG. 4A, thereby obscuring some content of the web page 224 by the toolbar 402. Subsequently, in decision step 304, a determination is made that at least a portion of the web page 224 within the viewing region is obscured by a user interface element, and the process 300 proceeds to step 305 where the user interface element is removed from the application 222. FIG. 4C provides an example illustration 420 of the web browser 222 in full screen content viewing mode after the toolbar 402 has been hidden from the display of the mobile device 110. The portion of the web page 224 that was previously obscured by the toolbar 402 as provided in the example illustration 410 of FIG. 4B is no longer obscured as provided in the example illustration 420 of FIG. 4C. The process 300 then ends in step 307 after step 305.

Figure 5:
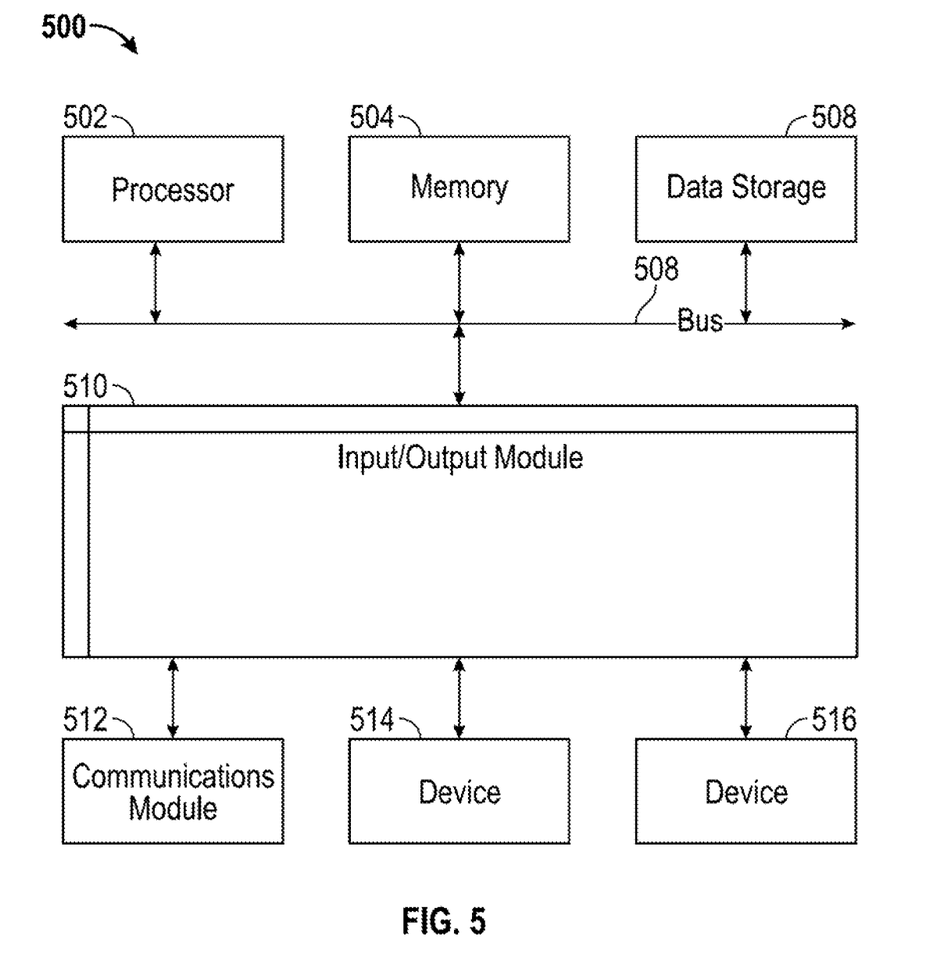
FIG. 5 is a block diagram illustrating an example computer system with which the client of FIG. 2 can be implemented.

FIG. 5 is a block diagram illustrating an example computer system 500 with which the client 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top edge (e.g., of the display of the application 222), a bottom edge, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method for entering a full screen content viewing interface of an application, the method comprising:
   providing an application comprising content for display within a viewing region of the application, the application displaying a user interface element that obscures at least a portion of the content when provided for display within the viewing region by reducing a size of the viewing region;
   receiving an indication that a single touch input was performed within the viewing region of the application;
   determining that at least a portion of the content provided for display within the viewing region of the application is obscured by the display of the user interface element; and
   automatically removing the display of the user interface element from the application in response to the indication that the single touch input occurred within a preset time period of the determination that at least a portion of the content is obscured.

2. The method of claim 1, wherein removing the display of the user interface element from the application comprises the application entering a full screen content viewing mode.

3. The method of claim 1, wherein the user interface element comprises at least one of a toolbar or a button.

4. The method of claim 1, wherein the application comprises a web browser.

5. The method of claim 4, wherein the single touch input comprises a single tap, the content comprises a web page, and wherein the single tap is received within the web page.

6. The method of claim 5, wherein the single tap is received upon any content within the web page.

7. The method of claim 5, wherein when at least a portion of the content within the viewing region is obscured by the user interface element and the single tap is received upon a hyperlink in the web page, the display of the user interface element is not removed from the application.

8. The method of claim 1, wherein the single touch input is received upon a non-visible layer overlaid on the viewing region.

9. The method of claim 1, wherein the single touch input occurs within a preset time period of when the content within the viewing region is obscured by the display of the user interface element.

10. The method of claim 9, wherein when the single touch input does not occur within the preset time period of when the content within the viewing region is obscured by the display of the user interface element, the user interface element is removed from the application.

11. A system for entering a full screen content viewing interface of an application, the system comprising
   a memory comprising instructions; and
   a processor configured to execute the instructions to:
      provide content for display within a viewing region of an application, the application displaying a user interface element that obscures a portion of the content provided for display within the viewing region by reducing a size of the viewing region;
      receive an indication that a single touch input was performed within the viewing region of the application;
      determine whether the portion of the content provided for display within the viewing region is obscured by the display of the user interface element; and
      responsive to receiving the indication that the single touch input occurred within a preset time period of determining that the portion of the content is obscured, automatically remove the display of the user interface element from the application and enter a full screen content viewing mode.

12. The system of claim 11, wherein the user interface element comprises at least one of a toolbar or a button.

13. The system of claim 11, wherein the application comprises a web browser.

14. The system of claim 13, wherein the single touch input comprises a single tap, the content comprises a web page, and wherein the single tap is received within the web page.

15. The system of claim 14, wherein the single tap is received upon any content within the web page.

16. The system of claim 14, wherein when at least a portion of the content within the viewing region is obscured by the user interface element and the single tap is received upon a hyperlink in the web page, the display of the user interface element is not removed from the application.

17. The system of claim 11, wherein the single touch input is received upon a non-visible layer overlaid on the viewing region.

18. The system of claim 11, wherein the single touch input occurs within a preset time period of when the content within the viewing region is obscured by the display of the user interface element.

19. The system of claim 18, wherein when the single touch input does not occur within the preset time period of when the content within the viewing region is obscured by the display of the user interface element, the user interface element is removed from the application.

20. A non-transitory machine-readable storage medium comprising machine-readable instructions for causing a processor to execute a method for entering a full screen content viewing interface of an application, the method comprising:
   provide a web browser comprising content for display within a viewing region of the web browser, the web browser displaying a user interface element comprising at least one of a toolbar or a button that obscures a portion of the content when provided for display within the viewing region by reducing a size of the viewing region;
   receiving an indication that a single touch input was performed within the viewing region of the web browser;
   determining whether a portion of the content provided for display within the viewing region is obscured by the display of the user interface element; and
   responsive to receiving the indication that the single touch input occurred within a preset time period of determining that the portion of the content is obscured, automatically removing the display of the user interface element from the web browser and entering a full screen content viewing mode.

* * * * *